United States Patent
Lim

(10) Patent No.: US 9,551,132 B2
(45) Date of Patent: Jan. 24, 2017

(54) AUTOMATIC TRANSMISSION CONTROL UNIT FOR CONSTRUCTION EQUIPMENT AND CONTROL METHOD THEREFOR

(71) Applicant: Doosan Infracore Co., Ltd., Incheon (KR)

(72) Inventor: Hyun Sik Lim, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 22 days.

(21) Appl. No.: 14/655,246

(22) PCT Filed: Dec. 17, 2013

(86) PCT No.: PCT/KR2013/011705
§ 371 (c)(1),
(2) Date: Jun. 24, 2015

(87) PCT Pub. No.: WO2014/104635
PCT Pub. Date: Jul. 3, 2014

(65) Prior Publication Data
US 2015/0345113 A1    Dec. 3, 2015

(30) Foreign Application Priority Data
Dec. 24, 2012  (KR) .................. 10-2012-0152106

(51) Int. Cl.
*E02F 9/22* (2006.01)
*E02F 9/26* (2006.01)
*F16H 61/456* (2010.01)

(52) U.S. Cl.
CPC ............. *E02F 9/2253* (2013.01); *E02F 9/226* (2013.01); *E02F 9/2292* (2013.01);
(Continued)

(58) Field of Classification Search
None
See application file for complete search history.

(56) References Cited

U.S. PATENT DOCUMENTS 4,904,161 A * 2/1990 Kamide ............... E02F 9/2246
417/218
2002/0073699 A1   6/2002 Nishimura et al.
(Continued)

FOREIGN PATENT DOCUMENTS

EP   0423353 A1   4/1991
EP   2444635 A1   4/2012
(Continued)

OTHER PUBLICATIONS

International Search Report with English Translation mailed Mar. 21, 2014 for corresponding International Application No. PCT/KR2013/011705, 5 pages.
(Continued)

*Primary Examiner* — John R Olszewski
*Assistant Examiner* — David Merlino
(74) *Attorney, Agent, or Firm* — John D. Veldhuis-Kroeze; Westman, Champlin & Koehler, P.A.

(57) ABSTRACT

The present disclosure relates to an automatic transmission control unit for construction machinery and a control method therefor, and when a load pressure detecting unit detecting a load pressure of hydraulic pressure supplied from a main hydraulic pump to an actuator, such as a cylinder and a hydraulic motor, is in an abnormal state, the automatic transmission control unit receives an electronic control pressure signal having little concerns of a breakdown or a malfunction, and automatically changes a travel speed of construction machinery based on the received electronic control pressure signal.

8 Claims, 3 Drawing Sheets

(52) U.S. Cl.
CPC ............ *E02F 9/2296* (2013.01); *E02F 9/268* (2013.01); *F16H 61/456* (2013.01)

(56) References Cited

U.S. PATENT DOCUMENTS

| | | | |
|---|---|---|---|
| 2003/0146845 A1* | 8/2003 | Imanishi | F04B 51/00 340/679 |
| 2011/0240147 A1* | 10/2011 | Yun | E02F 9/268 137/487.5 |
| 2014/0180550 A1* | 6/2014 | Vora | E02F 9/2246 701/50 |

FOREIGN PATENT DOCUMENTS

| | | |
|---|---|---|
| EP | 2530208 A1 | 12/2012 |
| JP | 10-338043 A | 12/1998 |
| KR | 10-2008-0018990 A | 2/2008 |
| KR | 10-2008-0049525 A | 6/2008 |
| KR | 10-2008-0102660 A | 11/2008 |
| KR | 10-2008-0105709 A | 12/2008 |
| WO | 2012157510 A1 | 11/2012 |

OTHER PUBLICATIONS

European Search Report dated Aug. 2, 2016 for European Application No. 13867341.3, 7 pages.

\* cited by examiner

AUTOMATIC TRANSMISSION CONTROL UNIT FOR CONSTRUCTION EQUIPMENT AND CONTROL METHOD THEREFOR

CROSS-REFERENCE TO RELATED APPLICATION

This application is a Section 371 National Stage application of International Application No. PCT/KR2013/011705, filed Dec. 17, 2013 and published, not in English, as WO 2014/104635 A1 on Jul. 3, 2014.

FIELD OF THE DISCLOSURE

The present disclosure relates to an automatic transmission control unit for construction machinery, and a control method therefor, and more particularly, to an automatic transmission control unit for construction machinery, which is capable of stably and automatically changing a travel speed of construction machinery, and a control method therefor.

BACKGROUND OF THE DISCLOSURE

In general, construction machinery including an excavator is capable of travelling and rotating, and performing work, such as excavation, by using a front working device, such as a boom, an arm, and a bucket, while travelling and rotating, or being in a stop state.

The construction machinery is capable of travelling in three modes including a low speed mode, a high speed mode, and an automatic transmission mode, and when the construction machinery travels in the automatic transmission mode, a speed is automatically changed to a low speed or a high speed according to loads applied to the front working device.

For the automatic transmission travel mode, the construction machinery detects hydraulic pressure applied from a main hydraulic pump to an actuator, such as a cylinder and a hydraulic motor, through a pressure sensor, and changes a travel speed into a low speed or a high speed according to the detected pressure.

That is, the construction machinery measures a size of loads based on the hydraulic pressure detected by the pressure sensor, and when the size of the loads is large, the construction machinery travels at a low speed, and when the size of the loads is small, the construction machinery travels at a high speed.

However, the aforementioned construction machinery in the related art determines a size of loads while relaying on only the pressure sensor during the automatic transmission travel. Accordingly, when the pressure sensor has a breakdown, the construction machinery cannot use the function even though the automatic transmission travel mode is selected, and when the pressure sensor has a malfunction, a safety accident may be incurred due to incorrect automatic travelling.

The discussion above is merely provided for general background information and is not intended to be used as an aid in determining the scope of the claimed subject matter.

SUMMARY

The summary and the abstract are provided to introduce a selection of concepts in a simplified form that are further described below in the Detailed Description. The summary and the abstract are not intended to identify key features or essential features of the claimed subject matter.

An embodiment of the present disclosure is conceived to solve the aforementioned problem, and provide an automatic transmission control unit for construction machinery, which is capable of, when construction machinery automatically changes a travel speed to a low speed and a high speed according to pressure of loads applied to a plurality of actuators operated by a hydraulic pump, stably and automatically changing a travel speed of construction machinery even though a breakdown is generated in a pressure sensor detecting the pressure of loads, and a control method therefor.

A technical object to be achieved in the present disclosure is not limited to the aforementioned technical objects, and other not-mentioned technical objects will be obviously understood from the description below by those skilled in the technical field to which the present disclosure pertains.

In order to achieve the object, an exemplary embodiment of the present disclosure provides an automatic transmission control unit for construction machinery, including: an electronic control-type hydraulic pump configured to supply hydraulic pressure to a plurality of actuators; a load pressure detecting unit connected to a discharge line of the electronic control-type hydraulic pump, and configured to detect load pressure applied from the electronic control-type hydraulic pump to the plurality of actuators; a manipulation pressure detecting unit configured to detect a manipulation pressure generated by a manipulation unit operating the plurality of actuators; and a controller configured to receive the load pressure detected by the load pressure detecting unit and the manipulation pressure detected by the manipulation pressure detecting unit, and control a pressure instruction of the hydraulic pump, in which when the load pressure detecting unit is in a normal state, the controller automatically changes a speed of a travel motor among the plurality of actuators based on the load pressure, and when the load pressure detecting unit is in an abnormal state, the controller automatically changes a speed of a travel motor based on the pressure instruction.

The automatic transmission control unit may further include a travel control valve configured to receive a travel control signal generated by the controller and adjust a swash plate tilting angle of the travel motor so as to adjust the hydraulic pressure supplied from the electronic control-type hydraulic pump to the travel motor.

Further, the controller may include: a pressure analyzing unit configured to analyze the load pressure or the manipulation pressure; and a travel control signal generating unit configured to generate the travel control signal according to a result of the analysis of the pressure analyzing unit.

In the meantime, in order to achieve the object, another exemplary embodiment of the present disclosure provides an automatic transmission control method for construction machinery, including: an automatic transmission travel operation of setting a travel speed of construction machinery to be in an automatic transmission mode; a normal state detecting operation of detecting a normal state of a load pressure detecting unit connected to a discharge line of an electronic control-type hydraulic pump supplying hydraulic pressure to a plurality of actuators provided in the construction machinery; a pressure analyzing operation of analyzing a load pressure detected by the load pressure detecting unit when the load pressure detecting unit is in a normal state, and analyzing a pressure instruction of the electronic control-type hydraulic pump controlled by a controller detecting a manipulation pressure generated by a manipulation unit operating the plurality of actuators when the load pressure detecting unit is in an abnormal state; a speed detecting operation of detecting a travel speed of the construction machinery; a pressure comparing operation of comparing a pressure value analyzed in the pressured analyzing operation with a predetermined pressure value; and a speed control operation of controlling the travel speed of the construction machinery according to a result of the comparison of the pressure value in the pressure comparing operation.

Further, when the travel speed detected in the speed detecting operation is smaller than a predetermined speed, and the pressure value analyzed in the pressure comparing operation is smaller than a predetermined first pressure value, the speed control operation may include controlling the travel speed of the construction machinery to be equal to or larger than a predetermined speed.

Further, when the travel speed detected in the speed detecting operation is smaller than a predetermined speed, and the pressure value analyzed in the pressure comparing operation is equal to or larger than a predetermined first pressure value, the speed control operation may include controlling the travel speed of the construction machinery to be smaller than a predetermined speed.

Further, when the travel speed detected in the speed detecting operation is equal to or larger than a predetermined speed, and the pressure value analyzed in the pressure comparing operation is equal to or larger than a predetermined second pressure value, the speed control operation may include controlling the travel speed of the construction machinery to be smaller than a predetermined speed.

Further, when the travel speed detected in the speed detecting operation is equal to or larger than a predetermined speed, and the pressure value analyzed in the pressure comparing operation is smaller than a predetermined second pressure value, the speed control operation may include controlling the travel speed of the construction machinery to be equal to or larger than a predetermined speed.

According to the present disclosure, in a case where a travel speed is automatically changed to a low speed or a high speed according to load pressure applied to the plurality of actuators operated by the hydraulic pump, when a problem is generated in the pressure sensor detecting the load pressure, a size of loads is analyzed based on a manipulation pressure that is an electronic control signal generated by the manipulation unit, and a travel speed of construction machinery is automatically changed based on the analyzed size of loads, so that there is an advantage in that the construction machinery is capable of stably performing automatic transmission travel.

Further, an electronic control signal having little concerns of a breakdown or a malfunction is used, so that there is an advantage in that an operation is not interrupted during a replacement of the pressure sensor.

DETAILED DESCRIPTION

Figure 1:
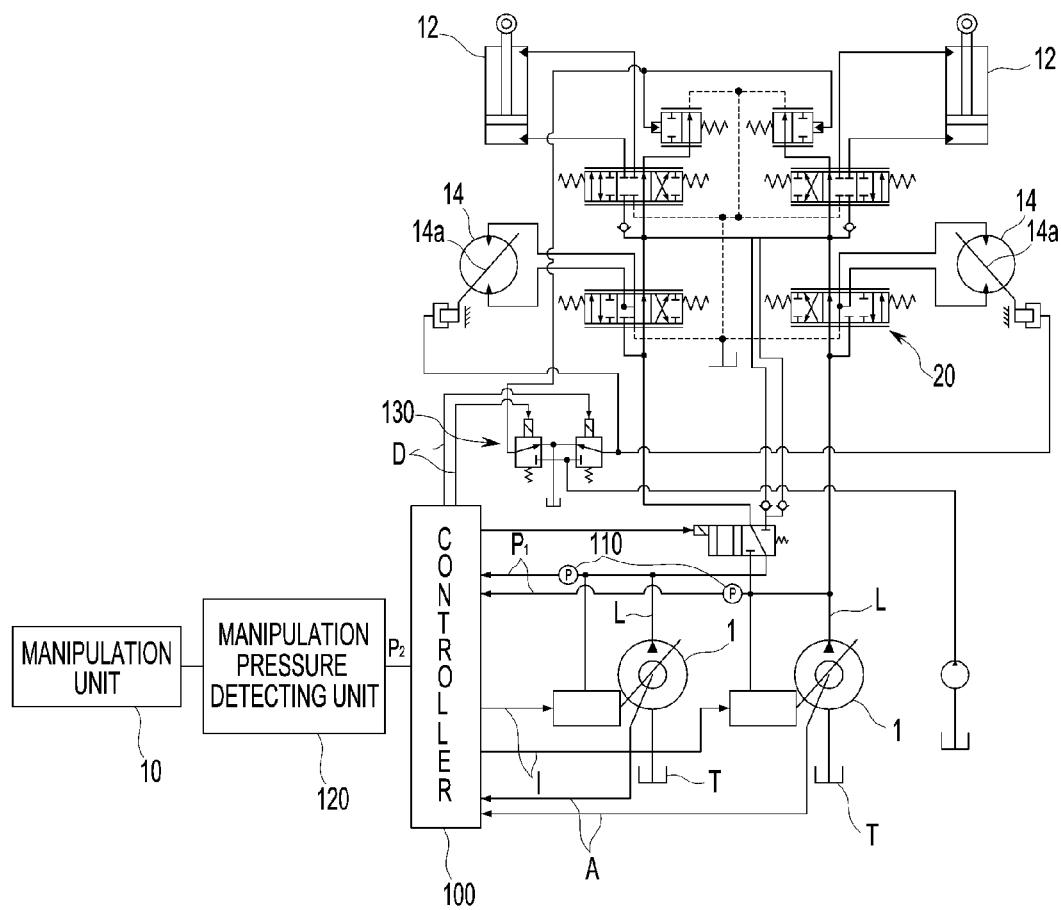
FIG. 1 is a hydraulic pressure circuit diagram illustrating a hydraulic system, to which an automatic transmission control unit for construction machinery and a control method therefor according to an exemplary embodiment of the present disclosure are applied.

Hereinafter, an exemplary embodiment according to the present disclosure will be described in detail with reference to the accompanying drawings. In the process, a size or a shape of a constituent element illustrated in the drawing, and the like, may be exaggerated for clarity and ease of description. In addition, the terms, which are specially defined in consideration of configurations and operations of the present disclosure, may vary depending on the intention or usual practice of a user or an operator. These terms should be defined based on the content throughout the present specification. Further, the spirit of the present disclosure is not limited to the suggested exemplary embodiment, those skilled in the art who understand the spirit of the present disclosure may easily carry out other exemplary embodiments within the scope of the same spirit, and of course, the exemplary embodiments also belong to the scope of the present disclosure.

FIG. 1 is a hydraulic pressure circuit diagram illustrating a hydraulic system, to which an automatic transmission control unit for construction machinery and a control method therefor according to an exemplary embodiment of the present disclosure are applied. An entire system of the hydraulic system will be described in detail with reference to FIG. 1.

As illustrated in FIG. 1, the hydraulic system of construction machinery includes an electronic control-type hydraulic pump 1, a manipulation unit 10, through which an operator inputs a manipulation signal and the like in order to manipulate the construction machinery, a hydraulic cylinder 12 operating a front working device, and a plurality of actuators including a travel motor 14 and the like provided with a rotary motor or a hydraulic motor, a sub control valve 20, a controller 100, and the like.

When an operator inputs a manipulation signal through the manipulation unit 10, the controller 100 receives the manipulation signal of the operator to operate the electronic control-type hydraulic pump 1, and when the electronic control-type hydraulic pump 1 discharges an oil quantity received from a tank T through a discharge line L, the oil quantity is supplied to the hydraulic cylinder 12, the travel motor 14, and the like through the plurality of sub control valves 20.

That is, the hydraulic cylinder 12 or the travel motor 14 operated by the hydraulic pressure of the electronic control-type hydraulic pump 1 operates the front working device or vehicle wheels of the construction machinery to perform an operation, such as an excavation, or travel.

Here, the electronic control-type hydraulic pump 1 supplies the hydraulic pressure to the hydraulic cylinder 12 and the travel motor 14 by a control signal of the controller 100, and generally receives power from a driving source, such as an engine, and provides the hydraulic pressure of the tank T.

As illustrated in FIG. 1, each of a regulator 1 and a regulator 2 receiving a pump input signal I from the controller 100 adjusts an opening/closing angle of the electronic control-type hydraulic pump 1 to adjust the hydraulic pressure discharged from the electronic control-type hydraulic pump 1.

Further, the opening/closing angle of the electronic control-type hydraulic pump 1 is controlled by the controller 100 receiving an angle signal A measured by the angle sensor, so that the hydraulic pressure is precisely controlled.

The hydraulic cylinder 12 receives the hydraulic pressure from the electronic control-type hydraulic pump 1, so that a cylinder rod is operated within maximum and minimum strokes, and thus, various front working devices are operated. The representative front working device operated by the hydraulic cylinder 12 is a bucket, and other front working devices including a breaker, a crusher, and a shear may be applied.

The travel motor 14 receives the hydraulic pressure from the electronic control-type hydraulic pump 1 to be rotated or reversely rotated or have an adjusted rotational speed, and the vehicle wheels are operated by the rotating travel motor 14, so that the construction machinery travels.

According to the exemplary embodiment of the present disclosure, as illustrated in FIG. 1, a pair of travel motors 14 is provided, and in this case, left and right vehicle wheels are individually operated by the travel motors 14, respectively. However, a configuration, in which only one travel motor is provided, so that all of the left and right vehicle wheels are operated through one travel motor, is acceptable depending on a case.

The sub control valve 20 adjusts hydraulic pressure supplied to the hydraulic cylinder 12 and the travel motor 14 under an operation control of a spool provided at the sub control valve 20 itself.

Figure 2:
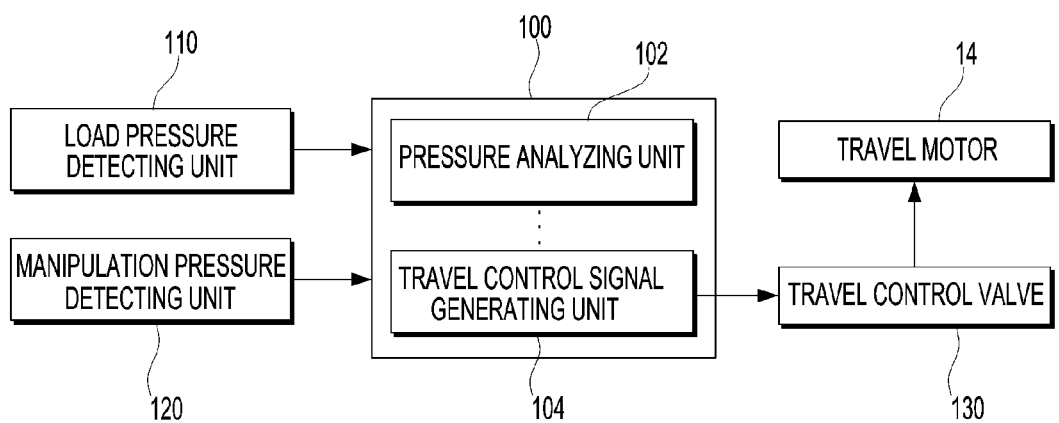
FIG. 2 is a configuration diagram illustrating the automatic transmission control unit for construction machinery according to the exemplary embodiment of the present disclosure.

FIG. 2 is a configuration diagram illustrating the automatic transmission control unit for construction machinery according to the exemplary embodiment of the present disclosure. A configuration and an operation process of the automatic transmission control unit will be described in detail with reference to FIG. 2.

The automatic transmission control unit is a device, which is capable of stably performing an automatic transmission function even though a problem is generated in a configuration detecting a load pressure when automatically changing a travel speed to a low speed or a high speed according to a load pressure applied to the plurality of actuators operated by the electronic control-type hydraulic pump 1, and includes a load pressure detecting unit 110, a manipulation pressure detecting unit 120, the controller 100, a travel control valve 130, and the like.

The load pressure detecting unit 110 is connected to a discharge line L of the electronic control-type hydraulic pump 1, and detects a load pressure $P_1$ applied from the electronic control-type hydraulic pump 1 to the plurality of actuators, such as the hydraulic cylinder 12 or the travel motor 14.

According to the exemplary embodiment of the present disclosure, the load pressure detecting unit 110 is formed of a pressure sensor and the like, and inputs the measured load pressure $P_1$ to the controller 100, and the controller 100 controls the hydraulic pressure of the electronic control-type hydraulic pump 1 according to the current load pressure $P_1$.

That is, the load pressure detecting unit 110 directly measures an output of the electronic control-type hydraulic pump 1 to detect a size of a current load, and the size of the load serves as a reference of a high-speed or low-speed travel when a travel speed is automatically changed.

The manipulation pressure detecting unit 120 detects a manipulation pressure $P_2$ generated by the manipulation unit 10, such as a joystick or a pedal, operated by the operator in order to manipulate the plurality of actuators.

According to the exemplary embodiment of the present disclosure, the manipulation pressure detecting unit 120 is also formed of a pressure sensor and the like, and inputs the measured manipulation pressure $P_2$ to the controller 100, and the controller 100 controls the plurality of actuators according to the current manipulation pressure $P_2$.

In this case, when the electric signal provided from the manipulation unit 10 to the controller 100 is the manipulation pressure $P_2$, and the manipulation unit 10 directly generates the manipulation pressure $P_2$ that is the electric signal, the manipulation pressure may be provided to the controller 100 without the manipulation pressure detecting unit 120, and other parameter values, for example, a current value, instead of the hydraulic pressure, may be detected and provided to the controller 100 according to the type of manipulation unit 10.

That is, the manipulation pressure detecting unit 120 detects the manipulation pressure $P_2$ generated by the manipulation unit 10 and outputs the detected manipulation pressure $P_2$ to the controller 100, and the controller 100 controls a pressure instruction I of the electronic control-type hydraulic pump 1 based on the manipulation pressure $P_2$, and the pressure instruction has little difference from a size of the load directly measured by the load pressure $P_1$.

Accordingly, the pressure instruction I of the electronic control-type hydraulic pump 1 controlled by the controller 100 also serves as a reference of a high-speed or low-speed travel when a travel speed is automatically changed.

The controller 100 receives the load pressure $P_1$ detected by the load pressure detecting unit 110 and the manipulation pressure $P_2$ detected by the manipulation pressure detecting unit 120 to generate a travel control signal D corresponding to the received pressures $P_1$ and $P_2$, and controls a pressure instruction, that is, the pump input signal I, of the electronic control-type hydraulic pump 1.

According to the exemplary embodiment of the present disclosure, when the load pressure detecting unit 110 is in a normal state, the controller 100 automatically changes a speed of the travel motor 14 based on the load pressure $P_1$.

By contrast, when the load pressure detecting unit 110 is in an abnormal state due to a breakdown or a malfunction, the controller 100 automatically changes a speed of the travel motor 14 based on the pressure instruction of the electronic control-type hydraulic pump 1.

The controller 100 includes a pressure analyzing unit 102 and a travel control signal generating unit 104. The pressure analyzing unit 102 analyzes the load pressure $P_1$ or the pressure instruction of the electronic control-type hydraulic pump 1, and the travel control signal generating unit 104 generates the travel control signal D according to a result of the analysis of the pressure analyzing unit 102.

Particularly, when the load pressure detecting unit 100 is in the normal state, the pressure analyzing unit 102 analyzes the load pressure $P_1$, and the travel control signal D corresponding to the analyzed load pressure $P_1$ is generated by the travel control signal generating unit 104.

By contrast, when the load pressure detecting unit 100 is in the abnormal state, the pressure analyzing unit 102 analyzes the pressure instruction of the electronic control-type hydraulic pump 1, and the travel control signal D corresponding to the analyzed pressure instruction is generated by the travel control signal generating unit 104.

According to the automatic transmission control unit for construction machinery according to the exemplary embodiment of the present disclosure, it is determined whether a current speed of the construction machinery is a low speed or a high speed, the load pressure $P_1$ analyzed by the pressure analyzing unit 102 or the pressure instruction of the electronic control-type hydraulic pump 1 is compared with a predetermined load value, so that a travel speed of the construction machinery is controlled to be automatically changed, and a travel speed is changed to a high speed or a low speed by the travel control valve 130.

That is, an opening rate of the travel control valve 130 is controlled by receiving the travel control signal D generated by the controller 100, and a swash plate tilting angle of the travel motor 14 is adjusted by the opening rate of the travel control valve 130, so that hydraulic pressure supplied from the electronic control-type hydraulic pump 1 to the travel motor 14 is adjusted.

That is, an inclined plate 14a is provided inside the travel motor 14, and the travel control valve 130 adjusts a swash plate tilting angle of the inclined plate 14a so as to correspond to the travel control signal D.

Here, the travel control signal D provided by the controller 100 is an electronic control signal, so that the travel control valve 130 is also provided in an electronic control type.

According to the exemplary embodiment of the present disclosure, the travel control valve 130 may be provided with an electronic control-type valve capable of adjusting an oil quantity, and a travel high speed solenoid valve, an electronic proportional pressure reduce (EPPR) valve, or the like are used.

Figure 3:
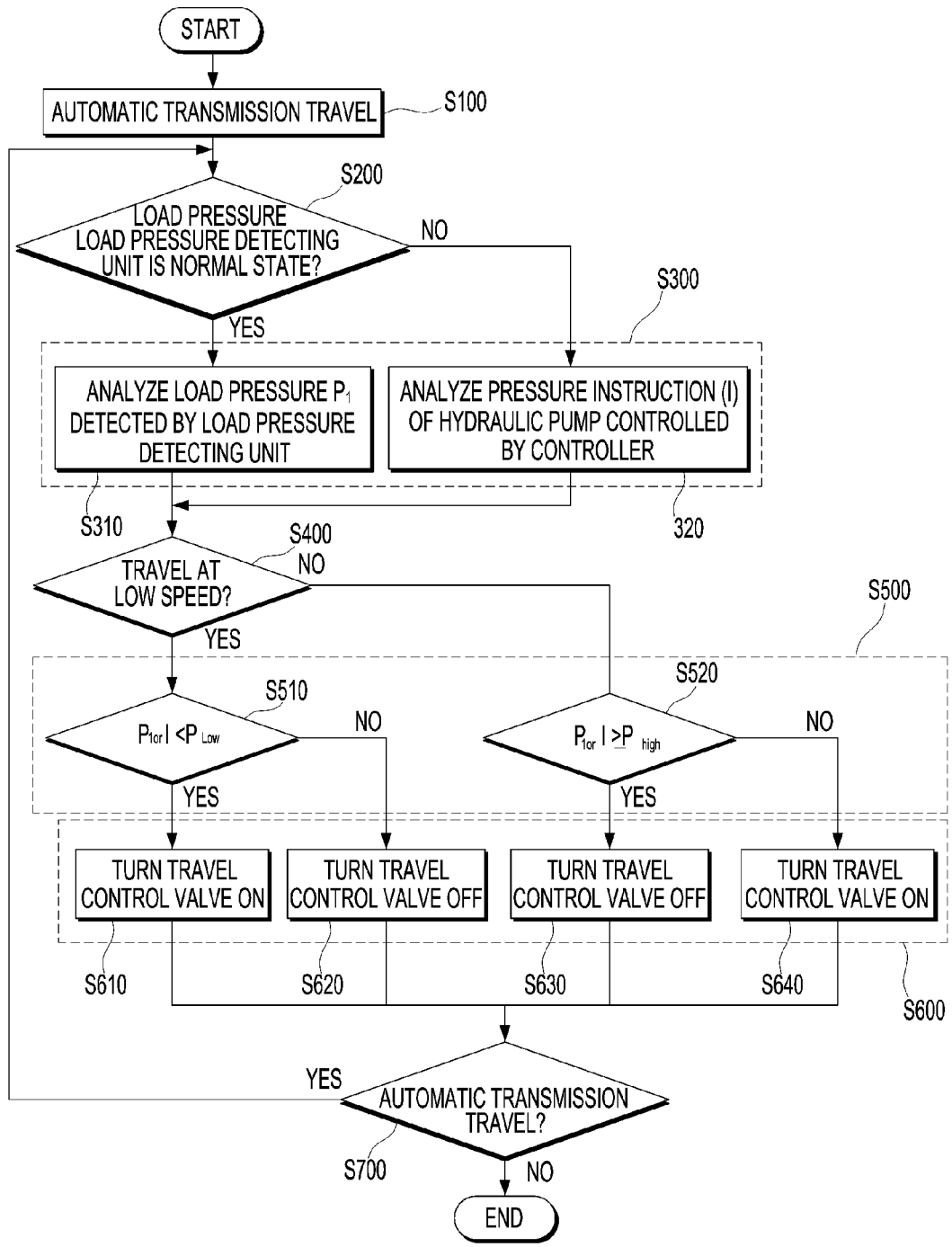
FIG. 3 is a flowchart illustrating an automatic transmission control method for construction machinery according to an exemplary embodiment of the present disclosure.

FIG. 3 is a flowchart illustrating an automatic transmission control method for construction machinery according to an exemplary embodiment of the present disclosure. The automatic transmission control method will be described in detail with reference to FIG. 3.

The automatic transmission control method is a method capable of stably performing an automatic transmission function even though a problem is generated in the load pressure detecting unit 110 detecting a load pressure $P_1$ when the construction machinery automatically changes a travel speed to a low speed or a high speed according to the load pressure $P_1$ applied to the plurality of actuators, and includes an automatic transmission travel operation S100, a normal state detecting operation S200, a pressure analyzing operation S300, a speed detecting operation S400, a pressure comparing operation S500, and a speed controlling operation S600.

First, when an operator of construction machinery sets a travel speed mode into an automatic transmission mode in order to use an automatic transmission function, the construction machinery travels, so that a speed thereof is automatically changed, and the automatic transmission control method is performed (S100).

When the construction machinery is set in the automatic transmission travel mode, a normal state of the load pressure detecting unit 110 is detected (S200).

That is, the present disclosure is characterized in that a speed of the construction machinery is automatically changed based on the load pressure $P_1$ detected by the load pressure detecting unit 110 in a general case, but when the load pressure detecting unit 110 has a breakdown or a malfunction, a size of loads is analyzed based on a pressure instruction of the electronic control-type hydraulic pump 1 controlled by the controller 100, so that a speed of the construction machinery is automatically transmitted, so that a normal state of the load pressure detecting unit 110 is detected when the automatic transmission mode is set.

In the pressure analyzing operation S300, when the load pressure detecting unit 100 is in the normal state, the load pressure $P_1$ detected by the load pressure detecting unit 110 is analyzed as described above (S310). By contrast, when the load pressure detecting unit 110 is in an abnormal state, the pressure instruction of the electronic control-type hydraulic pump 1 controlled by the controller 100 is analyzed (S320).

The speed detecting operation S400 is an operation of detecting a current travel speed of the construction machinery, and when the travel speed is smaller than a predetermined speed, it is determined that the construction machinery travels at a low speed, and when the travel speed is equal to or larger than the predetermined speed, it is determined that the construction machinery travels at a high speed.

Here, the predetermined speed is a travel speed optimally set in consideration of a load state, fuel efficiency, a safety state, and the like of the construction machinery, and may be variously set according to an operation and a travel environment, or a specification of the construction machinery, and contents of the present disclosure are not limited by the predetermined speed.

The pressure analyzing operation S500 is an operation of comparing the load pressure $P_1$ or the pressure instruction of the electronic control-type hydraulic pump 1 analyzed in the pressure analyzing operation S300 with a predetermined pressure value, and when it is determined that the construction machinery travels at the low speed in the speed detecting operation S400, the predetermined pressure value is set to about 160 bars as a first pressure value.

By contrast, when it is determined that the construction machinery travels at the high speed in the speed detecting operation S400, the predetermined pressure value is set to about 300 bars as a second pressure value.

The first pressure value and the second pressure value are illustrative, and may be variously set according to the kind of construction machinery, and contents of the present disclosure are not limited by the predetermined pressure value.

The speed controlling operation S600 is an operation of controlling a travel speed of the construction machinery according to a result of the comparison of the pressure comparing operation S500, and a travel speed of the construction machinery is controlled to a high speed or a low speed by opening or closing the travel control valve 134.

Last, when the travel speed of the construction machinery is automatically changed, and then the construction machinery is continuously set in the automatic transmission mode, the aforementioned operations are repeated, and when the construction machinery does not use the automatic transmission mode function, the automatic transmission travel is terminated (S700).

Hereinafter, the automatic transmission control process incurable in various cases will be described in detail.

First, when the travel speed detected by the speed detecting operation S400 is smaller than a predetermined speed, and the pressure value $P_1$ or I analyzed in the pressure comparing operation S510 is smaller than the predetermined first pressure value $P_{low}$, the travel speed of the construction machinery is controlled to be equal to or larger than the predetermined speed by opening the travel control valve 130 in the speed control operation S600 (S610).

In a case where the pressure value $P_1$ or I analyzed in the pressure comparing operation S510 is compared with the predetermined first pressure value $P_{low}$, the load pressure $P_1$ detected by the load pressure detecting unit 110 is compared with the first pressure value $P_{low}$ when the load pressure detecting unit 110 is in the normal state as described above, and the pressure instruction of the electronic control-type hydraulic pump 1 is compared with the first pressure value $P_{low}$ when the load pressure detecting unit 110 is in the abnormal state.

Further, when the travel speed detected by the speed detecting operation S400 is smaller than the predetermined speed, and the pressure value $P_1$ or I analyzed in the pressure comparing operation S510 is equal to or larger than the predetermined first pressure value $P_{low}$, the travel speed of the construction machinery is controlled to be smaller than the predetermined speed by closing the travel control valve 130 in the speed control operation S600 (S620).

In the meantime, when the travel speed detected by the speed detecting operation S400 is equal to or larger than the predetermined speed, and the pressure value $P_1$ or I analyzed in the pressure comparing operation S520 is equal to or larger than the predetermined second pressure value $P_{high}$, the travel speed of the construction machinery is controlled to be smaller than the predetermined speed by closing the travel control valve 130 in the speed control operation S600 (S630).

In a case where the pressure value $P_1$ or I analyzed in the pressure comparing operation S520 is compared with the predetermined second pressure value $P_{high}$, the load pressure $P_1$ detected by the load pressure detecting unit 110 is compared with the second pressure value $P_{high}$ when the load pressure detecting unit 110 is in the normal state as described above, and the pressure instruction of the electronic control-type hydraulic pump 1 is compared with the second pressure value $P_{high}$ when the load pressure detecting unit 110 is in the abnormal state.

Last, when the travel speed detected by the speed detecting operation S400 is equal to or larger than a predetermined speed, and the pressure value $P_1$ or I analyzed in the pressure comparing operation S520 is smaller than the predetermined second pressure value $P_{high}$, the travel speed of the construction machinery is controlled to be equal to or larger than the predetermined speed by opening the travel control valve 130 in the speed control operation S600 (S640).

The present invention has been described with reference to the exemplary embodiments illustrated in the drawings, but the exemplary embodiments are only illustrative, and it would be appreciated by those skilled in the art that various modifications and equivalent exemplary embodiments may be made. Accordingly, the actual scope of the present invention must be determined by the appended claims.

What is claimed is:

1. An automatic transmission control unit for construction machinery, comprising:
   an electronic control-type hydraulic pump configured to supply hydraulic pressure to a plurality of actuators;
   a load pressure detecting unit connected to a discharge line of the electronic control-type hydraulic pump, and configured to detect load pressure applied from the electronic control-type hydraulic pump to the plurality of actuators;
   a manipulation pressure detecting unit configured to detect a manipulation pressure generated by a manipulation unit operating the plurality of actuators; and
   a controller configured to receive the load pressure detected by the load pressure detecting unit and the manipulation pressure detected by the manipulation pressure detecting unit, and control a pressure instruction of the hydraulic pump,
   wherein when the load pressure detecting unit is in a normal state, the controller automatically changes a speed of a travel motor among the plurality of actuators based on the load pressure, and when the load pressure detecting unit is in an abnormal state, the controller automatically changes a speed of the travel motor based on the pressure instruction.

2. The automatic transmission control unit of claim 1, further comprising:
   a travel control valve configured to receive a travel control signal generated by the controller and adjust a swash plate tilting angle of the travel motor so as to adjust the hydraulic pressure supplied from the electronic control-type hydraulic pump to the travel motor.

3. The automatic transmission control unit of claim 2, wherein the controller includes:
   a pressure analyzing unit configured to analyze the load pressure or the manipulation pressure; and
   a travel control signal generating unit configured to generate the travel control signal according to a result of the analysis of the pressure analyzing unit.

4. An automatic transmission control method for construction machinery, comprising:
   an automatic transmission travel operation of setting a travel speed of construction machinery to be in an automatic transmission mode;
   a normal state detecting operation of detecting a normal state of a load pressure detecting unit connected to a discharge line of an electronic control-type hydraulic pump supplying hydraulic pressure to a plurality of actuators provided at the construction machinery;
   a pressure analyzing operation of analyzing a load pressure detected by the load pressure detecting unit when the load pressure detecting unit is in a normal state, and analyzing a pressure instruction of the hydraulic pump controlled by a controller detecting a manipulation pressure generated by a manipulation unit operating the plurality of actuators when the load pressure detecting unit is in an abnormal state;
   a speed detecting operation of detecting a travel speed of the construction machinery;
   a pressure comparing operation of comparing a pressure value analyzed in the pressured analyzing operation with a predetermined pressure value; and
   a speed control operation of controlling the travel speed of the construction machinery according to a result of the comparison of the pressure value in the pressure comparing operation.

5. The automatic transmission control method of claim 4, wherein when the travel speed detected in the speed detecting operation is smaller than a predetermined speed, and the pressure value analyzed in the pressure comparing operation is smaller than a predetermined first pressure value, the speed control operation includes controlling the travel speed of the construction machinery to be equal to or larger than the predetermined speed.

6. The automatic transmission control method of claim 4, wherein when the travel speed detected in the speed detecting operation is smaller than a predetermined speed, and the pressure value analyzed in the pressure comparing operation is equal to or larger than a predetermined first pressure value, the speed control operation includes controlling the travel speed of the construction machinery to be smaller than the predetermined speed.

7. The automatic transmission control method of claim 4, wherein when the travel speed detected in the speed detecting operation is equal to or larger than a predetermined speed, and the pressure value analyzed in the pressure comparing operation is equal to or larger than a predetermined second pressure value, the speed control operation includes controlling the travel speed of the construction machinery to be smaller than the predetermined speed.

8. The automatic transmission control method of claim 4, wherein when the travel speed detected in the speed detecting operation is equal to or larger than a predetermined speed, and the pressure value analyzed in the pressure comparing operation is smaller than a predetermined second pressure value, the speed control operation includes controlling the travel speed of the construction machinery to be equal to or larger than the predetermined speed.

* * * * *